June 11, 1929.   G. B. WADSWORTH   1,716,675
THEFT ALARM FOR AUTOMOBILES
Filed June 6, 1928   6 Sheets-Sheet 1

INVENTOR.
George B Wadsworth
BY
ATTORNEY.

June 11, 1929.  G. B. WADSWORTH  1,716,675
THEFT ALARM FOR AUTOMOBILES
Filed June 6, 1928  6 Sheets-Sheet 4

INVENTOR.
George B Wadsworth
BY
Allen & Allen
ATTORNEY.

Patented June 11, 1929.

1,716,675

UNITED STATES PATENT OFFICE.

GEORGE B. WADSWORTH, OF COVINGTON, KENTUCKY, ASSIGNOR TO THE CRIM, WADSWORTH & THIEL AUTO THEFT ALARM DEVELOPMENT COMPANY, OF CINCINNATI, OHIO, A CORPORATION OF OHIO.

THEFT-ALARM FOR AUTOMOBILES.

Application filed June 6, 1928. Serial No. 283,306.

My invention relates to a theft alarm for an automobile which, when set, will indicate by a sounding device any movement of the vehicle.

In the art there have been several developments in auto-theft alarms consisting in a sounding device which, when the ignition lock is locked, is moved to such a position that any movement of the car will be indicated by the operation of the sounding device. The theft of the car under such circumstances will be revealed to the police by the vibrations of the sounding device. As a specific example of a device which operates on this principle, reference is made to the Harry Hay Patent No. 1,689,434 of October 30, 1928.

Devices which include a bell having a clapper which is released for operation, while they illustrate an alarm principle which is effective inasmuch as they provide an alarm which may be noticed whether the car is towed or driven, are not particularly effective on smooth streets. Statistics have shown that the thieves who make a commercial business of stealing automobiles quite often tow the cars, which they are stealing, away and then conceal them in some private garage where they can, at their leisure, disguise the cars and readjust the locking devices so that they can drive the cars under their own power and thereafter dispose of them. It is therefore of paramount importance that the alarm, which will indicate to the police that the car is being moved by some unauthorized person, will operate regardless of the smoothness of the street over which the car is moved.

It is the object of my invention to provide an alarm which will be actuated by a system of pivoted weights which will cause the ringing of the bell in a distinctly loud manner regardless of the smoothness of the street over which the car is moved. It is further my object to provide a locking device which is coupled with the ignition so that when the driver shuts off his ignition the pivoted weights will be set so that when the car is moved the bell will be rung.

The above and other objects to which reference will be made during the ensuing disclosure I accomplish by that certain combination and arrangement of parts of which I have illustrated a preferred embodiment.

Referring to the drawings:—

Figure 9 is a plan view of the alarm bell casing.

Referring first to the general arrangement, the amoured casing 1 which houses the lock barrel and ignition switch is mounted on the dashboard of the machine and at the end of the casing 1 I have secured the elbow-shaped housing 2 within which the ignition circuit contacts are housed. Extending down from the housing 2 there is an armoured conduit 3 through which the flexible element extends which causes the bell ringing mechanism to be released for operation when the ignition switch is off. The conduit may be of desired length and shape to adjust itself to the particular model of car on which the alarm is to be installed. The bell ringing mechanism is housed in a metal housing 4 which may be bolted to the floor board of the machine as indicated with round headed bolts 5 having nuts 6 within the casing for fastening the casing in position.

The plan of operation is that when the ignition switch is turned off the bell ringing mechanism is set for operation and any movement of the car will then cause vibrations which cause a weighted member, which is suspended on springs, to oscillate. The weighted member causes a plurality of pawls to engage a disc and rotate the disc in one direction. As the disc rotates it causes a series of cams to rotate which tension and release, during their movement, a series of spring clappers which strike against the walls of the bell.

Referring to the structure of the lock housing and ignition switch, indicated in Figures 14 to 23, within the casing 1 I have provided a barrel lock having a casing 7 having an annular flange 8 which fits up against the dash and a cylindrical portion 9 which fits within the casing 1. The cylindrical portion 9 has a threaded hole 10 within which a screw 11 which extends through a hole 12 in the casing is secured. The position of this screw will be such that it will lie between the walls of the opening in the dashboard. Preferably the head 13 of the screw will be countersunk within the hole 12.

The rotatable barrel of the lock is indicated at 14 and a slot 15 is formed therein which secures one end of the link 16 which connects the locking barrel with the ignition switch and alarm control element. The link 16 has a projection 17 which, during the rotation of the lock barrel, strikes against lugs 18 formed on the lock barrel casing, thereby limiting the movement of the link and lock.

Figure 1:
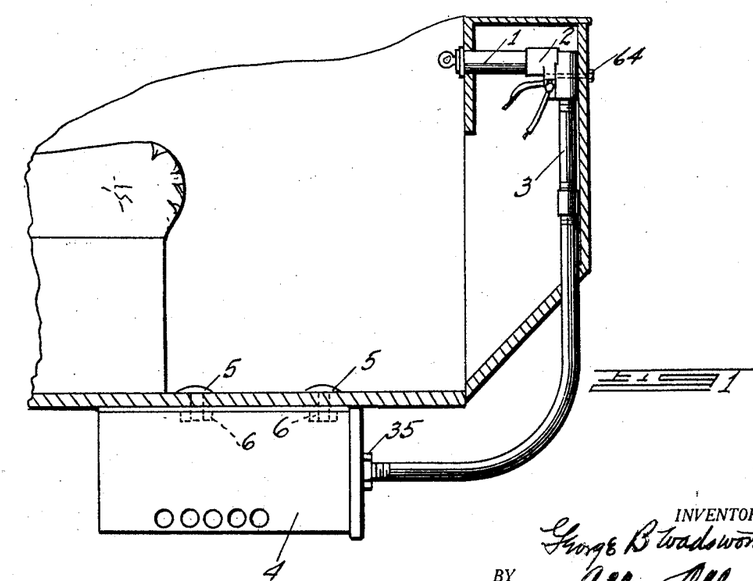
Figure 1 is a diagrammatic sectional view of the alarm device in position in an automobile.
Figure 2:
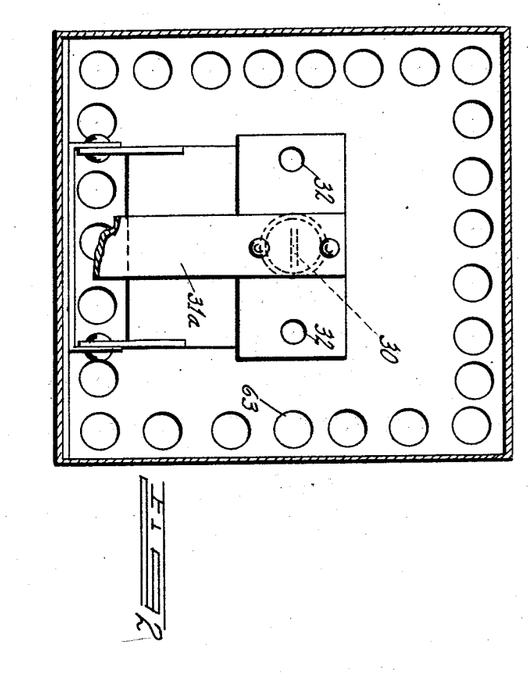
Figure 2 is a vertical lateral sectional view of the bell casing taken along the lines 2—2 in Figure 3.
Figures 3, 4, 5, 6, 7, 8:
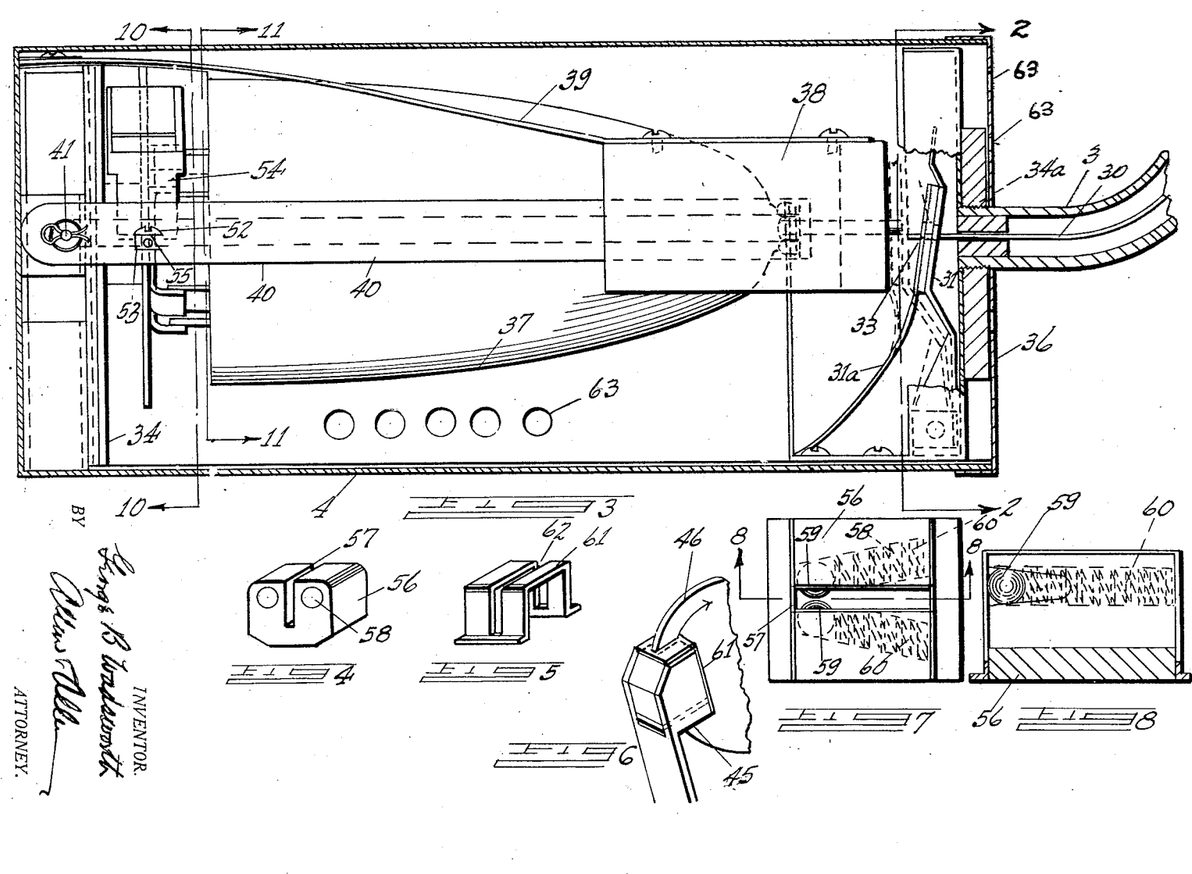
Figure 3 is a longitudinal vertical section of the alarm bell casing.
Figure 4 is a perspective view of the pawl block.
Figure 5 is a perspective view of the pawl block spring clip.
Figure 6 is a detail perspective view of one of the pawls attached to the ratchet wheel.
Figure 7 is a plan view of one of the assembled pawls.
Figure 8 is a sectional view through the slot in the pawl as indicated by the lines 8—8 in Figure 7.
Figure 6:
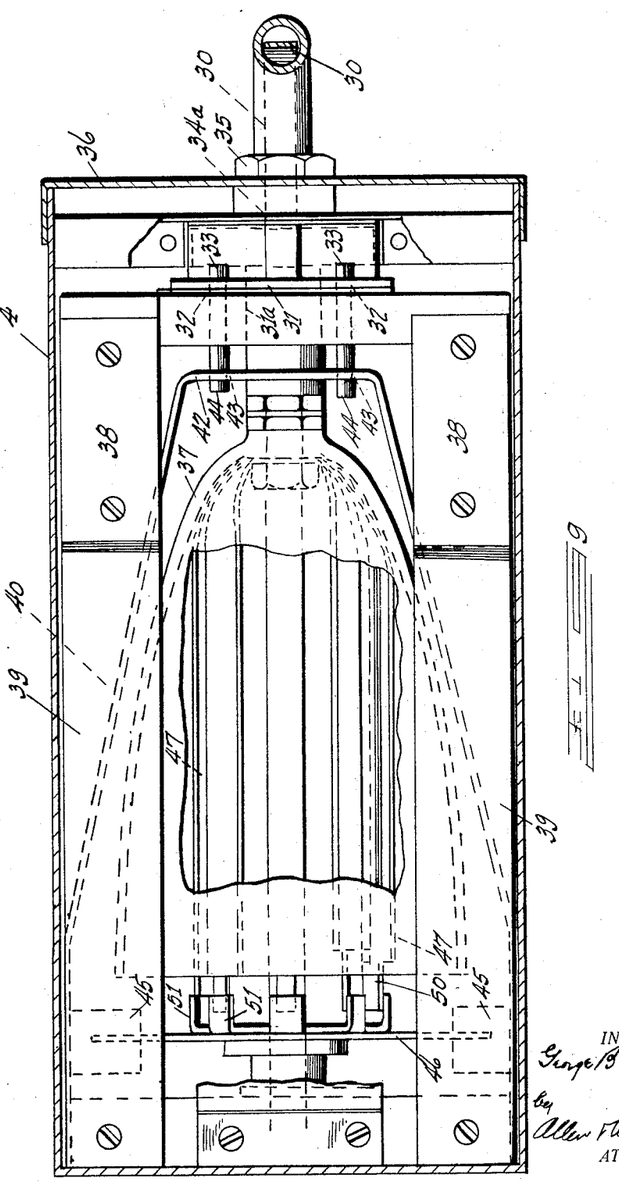
Figure 10:
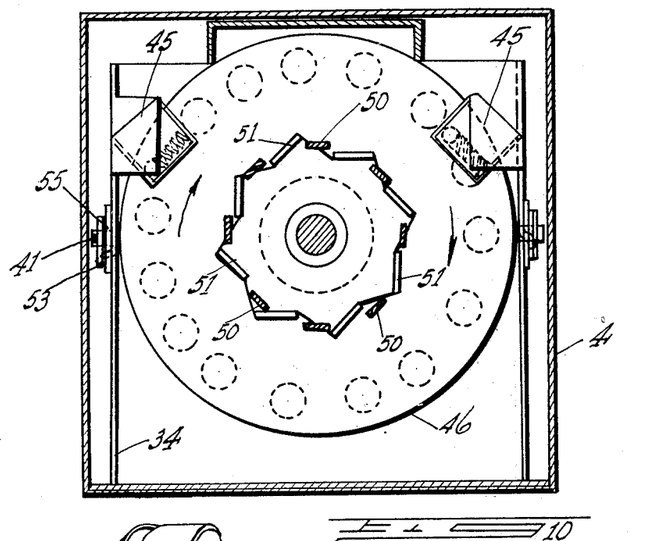
Figure 10 is a sectional view taken along the lines 10—10 in Figure 3.
Figures 11, 12:
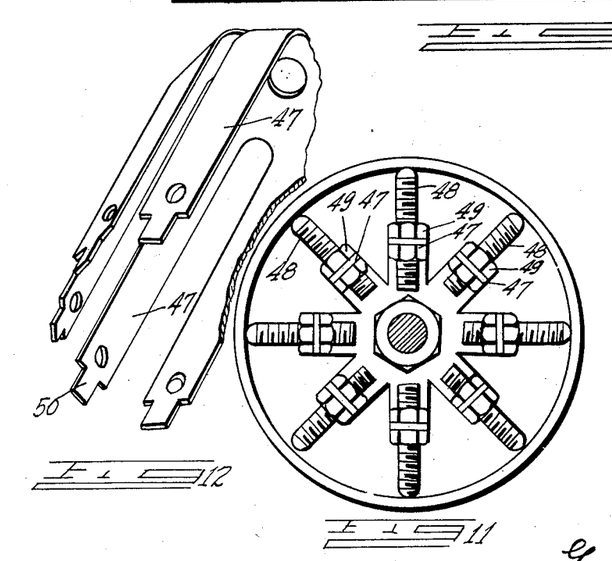
Figure 11 is a sectional view of the bell taken along the lines 11 in Figure 3.
Figure 12 is a perspective view of the clapper supports prior to the attachment of the clappers.
Figure 13:
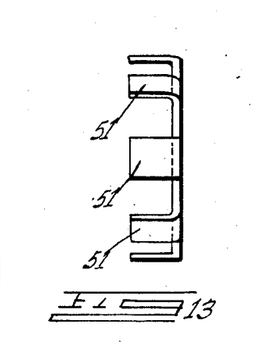
Figure 13 is a side elevation of the clapper actuating cam.
Figures 14, 15, 16, 17, 18:
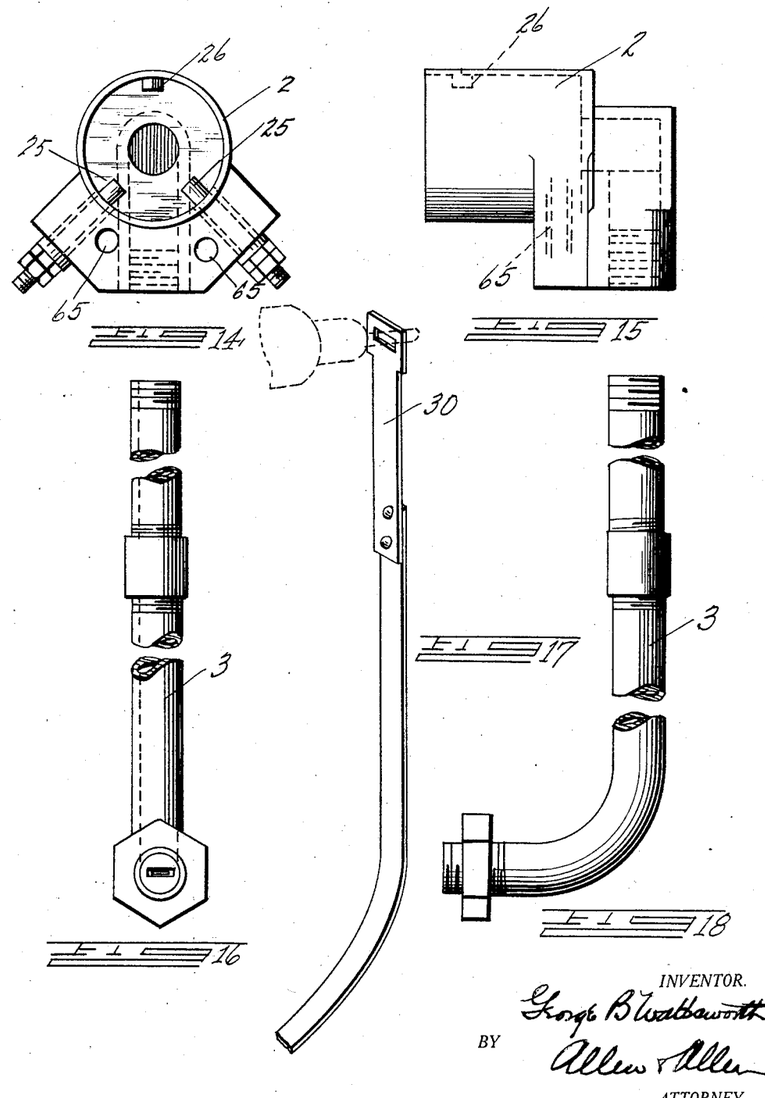
Figure 14 is a front elevation of the ignition contact housing.
Figure 15 is a side elevation of the housing shown in Figure 14.
Figure 16 is a front elevation of the armoured guide tube through which the flexible weight release element operates.
Figure 17 is a perspective view of the flexible weight release element.
Figure 18 is a side elevation of the armoured guide tube shown in Figure 16.
Figures 19, 20, 21, 22:
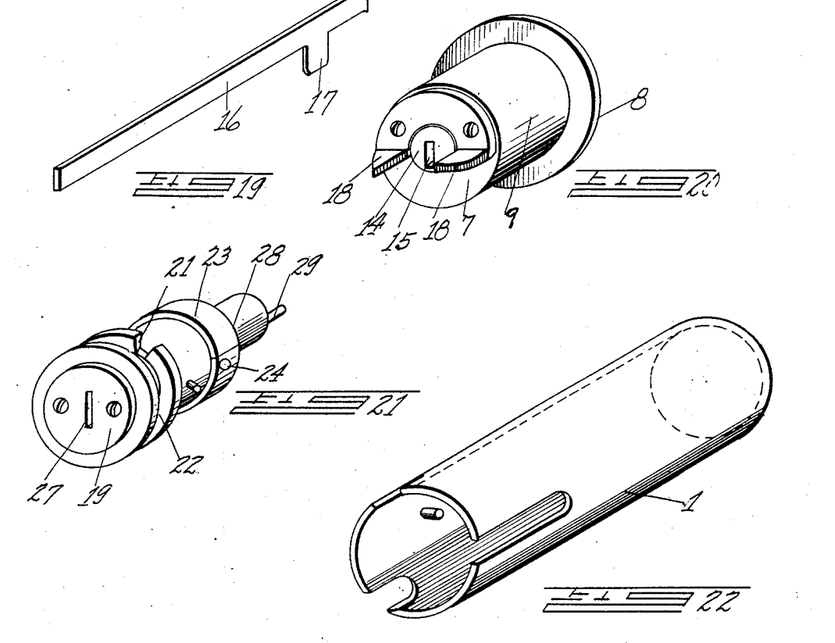
Figure 19 is a perspective view of the link connecting the lock drum and contact switch.
Figure 20 is a perspective of the stop plate for the link and the lock drum.
Figure 21 is a perspective view of the contact switch.
Figure 22 is a perspective view of the armoured tube for encasing the lock drum, contact switch and connecting link.
Figure 23:
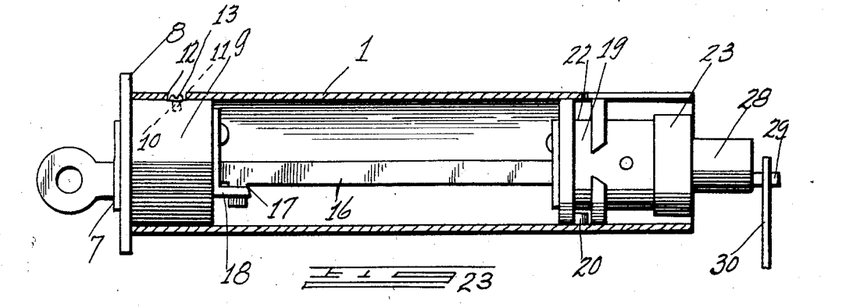
Figure 23 is a side elevation with parts in section showing the locking mechanism and contact switch.

A rotary switch contact member 19, which is indicated in Figure 21, is rotatably mounted within the casing being retained in non-slidable position therein by a lug 20 which extends from an inner wall of the casing 1 and allows slot 21 to pass, during the insertion of the member 19, so that the lug 20 will be retained within an annular groove 22 in the member 19. The member 19 has a fibrous disc 23 attached thereto with a segmentary metal plate 24 mounted on the outer periphery of the disk. The segment 24, during the rotation of the member 19, contacts with a pair of contact pins 25 extending through the elbow-shaped casing 2 as indicated in Figure 14. Contact posts 25$^a$ extend to the outside of the casing 2 to which the wires 25$^b$ of the ignition system may be secured. The casing 2 also has a pin 26 extending down from the inner wall which allows the casing 1 to be inserted within the casing 2 when the pin 26 and the slot 21 are in registry. After the casing 1 and 2 are united accordingly, the rotation of the member 19 causes the pin 26 to be engaged in the annular groove 22 so that unless the lock barrel is moved to the proper position, which will ordinarily be half way between the locked and unlocked position of the lock barrel, the two casings cannot be separated. This makes a structure which cannot be taken apart excepting by someone having the key to the lock.

The link 16 has an inner end which engages a slot 27 in the front face of the member 19 so that when the barrel of the lock is rotated the member 19 will also be rotated. Secured to the member 19 or formed integrally therewith is the barrel 28 which has a pin 29 eccentrically mounted thereon which, with the rotation of the member 19, raises and lowers the flexible element 30. The piece 30 which is indicated in Figure 17, bears against the outer surface of the pivot locking plate 31. A spring 31$^a$ tends to hold the locking plate in unlocked position. The locking plate has a pair of holes 32 in it which engage lugs 33 on the weighted frame which actuates the bell ringing mechanism. When the lock barrel is rotated to running position the flexible element bears against the plate 31 and causes the lugs 33 to be held in immovable position so that the weighted frame is not free to vibrate.

The alarm is mounted on frame members 34 which fits within the housing 4. The conduit 3 has all its connections either right or left hand so that one section cannot be removed until the one adjoining is first removed. A frame member 34, at one end of the housing, has a threaded aperture 34$^a$ within which the lower end of the conduit 3 is engaged, and a lock nut 35 mounted on the outer side of the lid 36 of the casing 4 is thereby held in position.

The mechanism for ringing the bell, which is indicated at 37, consists of a weighted frame having weights 38 and spring arms 39 on which the weights are suspended. Arms 40 are pivotally mounted as indicated at 41, and a cross arm 42, which connects the ends of the bars 40, has a pair of holes 43 which engage, when the flexible element is depressed, pins 44 which extend from the rear face of the front end of the weighted frame.

The arms 40 carry the pawl units 45 which engage and rotate the ratchet or friction disc 46. Within the bell there are a series of spring arms 47 each carrying a clapper, which, in the illustration, are formed by the ends of bolts 48, the nuts 49 providing enough weight to make a clear tone when the clapper strikes the bell. The particular type of clapper illustrated is merely for purposes of illustration, as other types of clappers may be used. Each spring arm has an extension 50 at its end which, during the rotation of the friction disc 46, engages a series of cam elements 51 carried by the disc. There are an uneven number of cam elements and clappers so that when the disc 46 is rotated the several clappers will be tensioned and releases so as to strike against the walls of the bell at different intervals.

The structure of the pawl units is such that the disc is rotated uniformly in one direction. There are two sets of pawl units, one on one side, and the other on the other, so that when the unit on one side is moving down it will drive the disc, while the unit on the other side will hold the disc to prevent the returning movement of the first unit from carrying the disc back. Then the first unit holds the disc against reverse movement when the other unit is contributing to the rotary movement of the disc.

The arms 40 have openings 52 which retain extensions 53 of the brackets 54 which carry the pawl units. In order to provide a connection between the aforementioned parts which will permit the pawl unit always to remain in the plane of the disc, I have provided a tongue 55 which provides a bearing for the extensions 53. The pawl units are composed of blocks 56 having slots 57 cut therein within which the friction disc is retained. From one side of the block a pair of passages 58 lead diagonally across the block opening out into the slot 57. Within each passage a ball bearing 59 is mounted and held in position by a spring 60. The springs and ball bearings are held in place within the ratchet unit by clips 61 which resiliently engage the blocks. The clips 61 have slots 62 which register with the slots 57 in the blocks.

In order to provide a casing from which the sound of the ringing of the bell will readily be transmitted, it is preferable to punch holes 63 in both the bell casing and the walls of the frame which supports the bell.

In assembling the device the bell casing 4 is first attached under the floor board of the machine. The frame sporting the bell is then inserted. Then the curved armoured conduit 3 having the flexible element 30 retained therein is screwed in and the lock nut drawn down to hold the lid in position. The elbow-shaped housing 2 is next attached and secured in position to the cowl dash as with bolts 64 which pass through holes 65.

The armoured casing 1 having the lock assembly and the link connecting it with the rotary member 19 are then inserted within the housing with the slot 21 so positioned as to pass the pin 26. When the key is turned in the lock the pin 26 will be retained within the annular groove 22. This makes an assembly which cannot be removed excepting by turning the lock barrel to such a position that the pin 26 will register with the slot 21 when the casing 1 may be removed from the elbow 2.

The operation of the alarm will be apparent. The driver, when he wishes to drive his car, must turn on the ignition. When he does this the flexible element is pushed down within the armoured conduit so that the weighted frame is held stationary. When the car is stopped the ignition switch will be turned off and this pulls up the flexible element and releases the alarm for operation. With the slightest movement of the car the bell will begin to ring and the police or others will have their attention drawn to the fact that the car is being moved by an unauthorized person.

If the car is left locked in a garage and a mechanic wishes to move the car, he can drive the car under its own power by inserting a wire between the contacts of the ignition switch. In such a case, however, the alarm bell will ring. This is thought to be an advantage because there will not be any likelihood of "joy-riding". A further advantage of my novel alarm is that the slightest jar will set the alarm in operation. Frequently cars are bumped in parking and often serious damage is done. There would be much more likelihood of the police apprehending someone who has bumped a parked car if an alarm clearly indicating that the car has been bumped were to be sounded.

Figure 24:
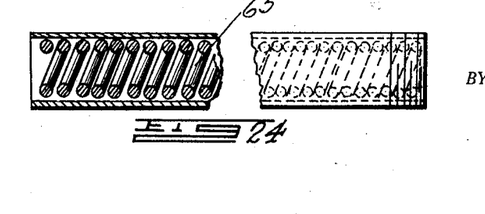
Figure 24 is a detail of a preferred type of armoured conduit.

The armoured conduit may have incased therein a flexible hardened steel lining such as a close wound steel spring such as is indicated at 65 in Figure 24, or ribbon which will offer great resistance to the blade of a hack saw or other tool with which a thief may attempt to foil the alarm signal.

Having thus described my invention, what I claim as new and desire to secure by Letters Patent, is:—

1. An auto theft alarm comprising an alarm bell having a series of resiliently mounted clappers associated therewith, means for tensioning and releasing said clappers so that they will strike said bell, and means operable from the dashboard of an automobile for preventing the operation of said first mentioned means, said first mentioned means including a vibration sensitive resiliently suspended weighted frame, and a pair of friction pawl elements operatively connected with said frame, and a rotatable disc having a series of cams thereon.

2. An auto theft alarm comprising an alarm bell having a series of resiliently mounted clappers associated therewith, means for tensioning and releasing said clappers so that they will strike said bell, and means operable from the dashboard of an automobile for preventing the operation of said first mentioned means, said resiliently mounted clappers comprising a series of spring arms mounted within said bell.

3. An auto theft alarm comprising an alarm bell having a series of resiliently mounted clappers associated therewith, means for tensioning and releasing said clappers so that they will strike said bell, and means operable from the dashboard of an automobile for preventing the operation of said first mentioned means, said resiliently mounted clappers comprising a series of spring arms mounted within said bell, a series of cams for tensioning and releasing said clappers and a rotatable member on which said cams are mounted.

4. An auto theft alarm comprising an alarm bell having a series of resiliently mounted clappers associated therewith, means for tensioning and releasing said clappers so that they will strike said bell, and means operable from the dashboard of an automobile for preventing the operation of said first mentioned means, said first mentioned means including a vibration sensitive resiliently suspended weighted frame, said means operable from the dashboard comprising a device for fixedly securing said weighted frame.

5. An auto theft alarm comprising a locking device coupled with the ignition circuit, an alarm bell with a casing retaining said bell, said bell released for operation when said locking device is in off position of the ignition circuit, interconnecting means extending between said locking device and bell casing, and housings for said locking device and bell casing, and an armoured casing extending between said housing, said casing demountable only in unlocked position of said locking device.

6. An auto theft alarm comprising a locking device, an alarm casing, and a conduit connecting said locking device and casing, a flexible conduit connecting said locking device and alarm casing, and a casing enclosing said locking device removable only when said locking device is in unlocked position.

7. An auto theft alarm comprising a locking device coupled with the ignition circuit, an alarm bell with a casing retaining said bell, said bell released for operaton when said locking device is in off position of the ignition circuit, interconnecting means extending between said locking device and bell casing, and housings for said locking device and bell casing, and interconnecting means demountable only in a certain position of said locking device, said interconnecting means comprising an armoured conduit with a flexible element movable by said locking device.

8. An alarm comprising a bell, resiliently mounted clappers associated with said bell, means for intermittently tensioning and releasing said clappers, and a vibration motor the oscillations of which actuate said means, whereby when said alarm is moved said vibration motor will cause the operation of said alarm.

9. An alarm comprising a bell, resiliently mounted clappers associated with said bell, means for intermittently tensioning and releasing said clappers, and a vibration motor the oscillations of which actuate said means, whereby when said alarm is moved said vibration motor will cause the operation of said alarm, said clappers mounted within said bell.

10. An alarm comprising a bell, resiliently mounted clappers associated with said bell, means for intermittently tensioning and releasing said clappers, and a vibration motor the oscillations of which actuate said means, whereby when said alarm is moved said vibration motor will cause the operation of said alarm, said clappers mounted within said bell, and said means comprising a rotatable disc having a series of radially concentric cams mounted thereon.

11. An alarm comprising a bell, resiliently mounted clappers associated with said bell, means for intermittently tensioning and releasing said clappers, and a vibration motor the oscillations of which actuate said means, whereby when said alarm is moved said vibration motor will cause the operation of said alarm, a pawl and ratchet providing the actuating connection between said vibration motor and said means, said pawl comprising a slotted block having a pair of diagonal holes therein opening into said slot, with ball bearings in said holes and springs for maintaining said ball bearings in actuating position.

12. A vibration motor comprising a weighted frame having a horizontal spring support, a pair of pivoted arms extending to the weighted end of said frame, connecting means from said frame to said arms, a disc rotatable in one direction, said arms extending on opposite sides of said disc and ratchets carried by said arms for rotating said disc.

13. A vibration motor comprising a weighted frame having a horizontal spring support, a pair of pivoted arms extending to the weighted end of said frame, connecting means from said frame to said arms, a disc rotatable in one direction, said arms extending on opposite sides of said disc and ratchets carried by said arms for rotating said disc, said pawls comprising slotted blocks having pairs of diagonal holes therein with balls in the holes and springs pressing said balls toward engaging position in the slots in the blocks.

14. A pawl drive for a frictionally engaged rotatable ratchet disc comprising a pair of pawls arranged on opposite sides of said disc, means carrying said pawls and said pawls comprising slotted blocks with said disc extending within said slots, said blocks having ball bearings retained in diagonally extending holes opening into said slotted portion with resilient means for pressing said balls toward engaging position within said slots.

GEORGE B. WADSWORTH.